(12) United States Patent
Kim et al.

(10) Patent No.: US 11,198,752 B2
(45) Date of Patent: Dec. 14, 2021

(54) POLYMER-GRAPHENE COMPOSITE, METHOD FOR PREPARING SAME, AND POLYMER-GRAPHENE COMPOSITE COMPOSITION USING SAME

(71) Applicant: LG Chem, Ltd., Seoul (KR)

(72) Inventors: Yong Wook Kim, Daejeon (KR); Won Jong Kwon, Daejeon (KR)

(73) Assignee: LG Chem, Ltd.

( * ) Notice: Subject to any disclaimer, the term of this patent is extended or adjusted under 35 U.S.C. 154(b) by 554 days.

(21) Appl. No.: 15/743,831

(22) PCT Filed: Jan. 6, 2017

(86) PCT No.: PCT/KR2017/000220
§ 371 (c)(1),
(2) Date: Jan. 11, 2018

(87) PCT Pub. No.: WO2017/119779
PCT Pub. Date: Jul. 13, 2017

(65) Prior Publication Data
US 2019/0085114 A1  Mar. 21, 2019

(30) Foreign Application Priority Data
Jan. 7, 2016 (KR) .................. 10-2016-0002238

(51) Int. Cl.
*C08F 292/00* (2006.01)
*C08K 3/04* (2006.01)
(Continued)

(52) U.S. Cl.
CPC ............ *C08F 292/00* (2013.01); *B82Y 30/00* (2013.01); *B82Y 40/00* (2013.01); *C01B 32/194* (2017.08);
(Continued)

(58) Field of Classification Search
CPC ..... C01B 32/194; B82Y 30/00; C08F 292/00; C08K 3/042
See application file for complete search history.

(56) References Cited

U.S. PATENT DOCUMENTS 6,106,339 A     8/2000 Nagai
2001/0020053 A1* 9/2001 Mariaggi ............... C08J 5/00
                                                  523/130
(Continued)

FOREIGN PATENT DOCUMENTS

CN    1162962 A    10/1997
CN    1436198 A    8/2003
(Continued)

OTHER PUBLICATIONS

Liu et al., "Edge-functionalized graphene as reinforcement of epoxy-based conductive composite for electrical interconnects," Composites Sci. and Technol. 88, 84-91 (2013).*
(Continued)

*Primary Examiner* — Kregg T Brooks
(74) *Attorney, Agent, or Firm* — Lerner, David, Littenberg, Krumholz & Mentlik, LLP

(57) ABSTRACT

The present invention relates to a polymer-graphene composite, in which a polymer has been introduced onto the surface of graphene while maintaining the structural features and mechanical properties of the graphene, thereby realizing an excellent dispersibility in an organic solvent, a method for preparing the same, and a polymer-graphene composite composition using the same.

6 Claims, 6 Drawing Sheets

(51) Int. Cl.
| | |
|---|---|
| C01B 32/194 | (2017.01) |
| C08L 101/00 | (2006.01) |
| B82Y 40/00 | (2011.01) |
| B82Y 30/00 | (2011.01) |
| C08J 3/11 | (2006.01) |

(52) U.S. Cl.
CPC ............. *C08J 3/11* (2013.01); *C08K 3/042* (2017.05); *C08L 101/00* (2013.01); *C08J 2333/08* (2013.01); *C08J 2333/10* (2013.01); *C08J 2425/06* (2013.01); *C08J 2433/20* (2013.01)

(56) References Cited

U.S. PATENT DOCUMENTS

| | | | |
|---|---|---|---|
| 2004/0034182 A1 | 2/2004 | Raether et al. | |
| 2011/0017587 A1* | 1/2011 | Zhamu | B82Y 30/00 204/157.62 |
| 2013/0202519 A1* | 8/2013 | Howard | C01B 32/174 423/447.1 |
| 2015/0329741 A1 | 11/2015 | Yoo et al. | |
| 2015/0333124 A1 | 11/2015 | Hintermann et al. | |
| 2017/0009030 A1* | 1/2017 | Hanan | C08K 3/042 |
| 2017/0081195 A1* | 3/2017 | Blanford | C01B 32/19 |

FOREIGN PATENT DOCUMENTS

| | | |
|---|---|---|
| CN | 102675512 A | 9/2012 |
| CN | 102862976 A | 1/2013 |
| CN | 102898680 A | 1/2013 |
| CN | 103935987 A | 7/2014 |
| CN | 104884383 A | 9/2015 |
| CN | 105153381 A | 12/2015 |
| JP | 2012051993 A | 3/2012 |
| KR | 101090517 B1 | 12/2011 |
| KR | 101121557 B1 | 3/2012 |
| KR | 101150974 B1 | 5/2012 |
| KR | 101325530 B1 | 11/2013 |
| KR | 20130129588 A | 11/2013 |
| KR | 20140086170 A | 7/2014 |
| KR | 20140102333 A | 8/2014 |
| KR | 20150095749 A | 8/2015 |
| WO | WO-2014032378 A1 * | 3/2014 ........... C01B 32/194 |

OTHER PUBLICATIONS

Dow Chemical, Dow Liquid Epoxy Resins (1999).*
Quiles-Diaz et al., "Anhydride-based chemistry on graphene for advanced polymeric materials," RSC Adv. 6, 36656, with Supplemental Information (2016).*
Huang et al., "Effect of maleic anhydride modified MWCNTs on the morphology and dynamic mechanical properties of its PMMA composites," Mat. Chem. Phys. 129, 1214-1220 (2011).*
Pei Zhang, et al. "Preparation of MWCNTs grafted with polyvinyl alcohol through Friedel-Crafts alkylation and their composite fibers with enhanced mechanical properties", Journal of Materials Chemistry A, vol. 3, Oct. 3, 2014, pp. 1442-1449.
Fang et al., "Covalent polymer functionalization of graphene nanosheets and mechanical properties of composites", Journal of Materials Chemistry, Jul. 2009, vol. 19, pp. 7098-7105.
Fu et al., "Fabrication and characterization of nanocomposites with high-impact polystyrene and hydroxyapatite with well-defined polystyrene via ATRP", Journal of Reinforced Plastics & Composites, Sep. 16, 2011, vol. 30, No. 17, pp. 1445-1453.
International Search Report for Application No. PCT/KR2017/000220 dated Jun. 2, 2017.
Kuila et al., "Functionalized-graphene/ethylene Vinyl Acetate Copolymer Composites for Improved Mechanical and Thermal Properties", Polymer Testing, Dec. 2011, vol. 31, pp. 282-289.
Kumar et al., "Covalently grafted graphene oxide-poly-(Cn) acrylate nanocomposites by surface-initiated ATRP: An efficient anti-friction, anti-wear and pour point depressant lubricating additive in oil media", Industrial & Engineering Chemistry Research, Jul. 2016.
Lee et al., "Polymer Brushes via Controlled, Surface-Initiated Atom Transfer Radical Polymerization (ATRP) from Graphene Oxide", Macromolecular Rapid Communications, Nov. 2009, vol. 31, pp. 281-288.
Roghani-Mamaqani et al, "Kinetic Study of Styrene Atom Transfer Radical Polymerization From Hydroxyl Groups of Graphene Nanoplatelets: Heterogeneities in Chains and Graft Densities", Polymer Engineering and Science, Sep. 20, 2014, pp. 1720-1732.
Roghani-Mamaqani et al., "Polystyrene-grafted graphene nanoplatelets with various graft densities by atom transfer radical polymerization from the edge carboxyl group", Royal Society of Chemistry, May 2014, vol. 4, pp. 24439-24452.
Roghani-Mamaqani, "Surface-initiated ATRP of styrene from epoxy groups of graphene nanolayers: twofold polystyrene chains and various graft densities", Royal Society of Chemistry, Jun. 2015, vol. 5, pp. 53357-53368.
Yang et al., "Exfoliated Graphite Oxide Decorated by PDMAEMA Chains and Polymer Particles:, Langmuir Article, Jul. 14, 2009, vol. 25, No. 19, pp. 11808-11814.
Extended European Search Report including Written Opinion for Application No. EP17736151.6 dated Jun. 19, 2018.
Gil Goncalves et al., "Graphene oxide modified with PMMA via ATRP as a reinforcement filler", Journal of Materials Chemistry, Jan. 1, 2010, vol. 20, No. 44, pp. 9927-9934, XP055482565.
Horacio J. Salavagione et al., "Polymeric Modification of Graphene through Esterification of Graphite Oxide and Poly(vinyl alcohol)", Macromolecules, Sep. 8, 2009, vol. 42, No. 17, pp. 6331-6334, XP055482562.
Chinese Search Report for Application No. 201780003006.6 dated Aug. 28, 2020, 1 page.
Jeon, I.Y. et al., "Formation of Large-Area Nitrogen-Doped Graphene Film Prepared from Simple Solution Casting of Edge-Selectively Functionalized Graphite and Its Electrocatalystic Activity", Chemistry of Materials, Aug. 2011, pp. 3987-3992.

* cited by examiner

[Fig 1]
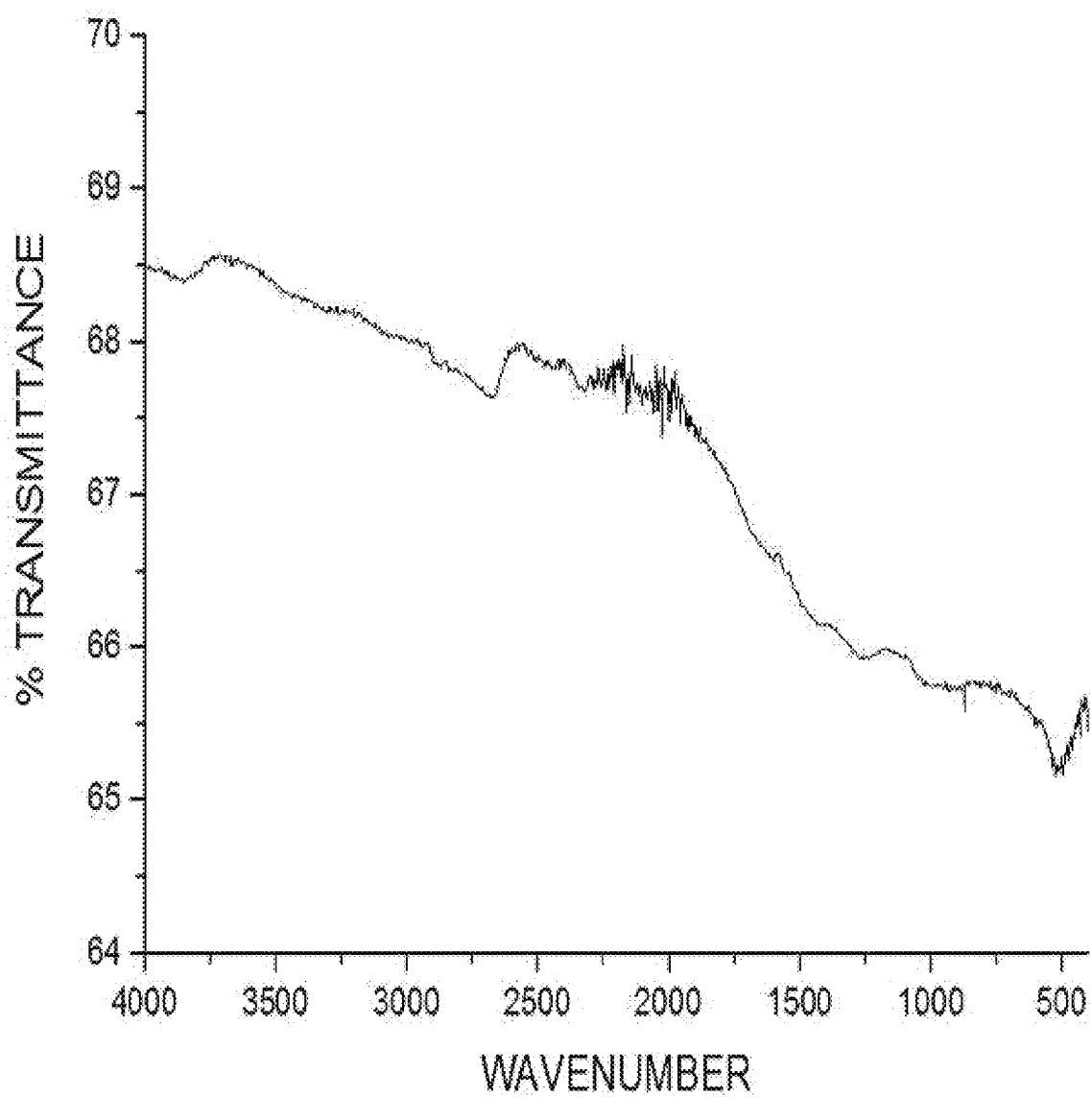

[Fig 2]
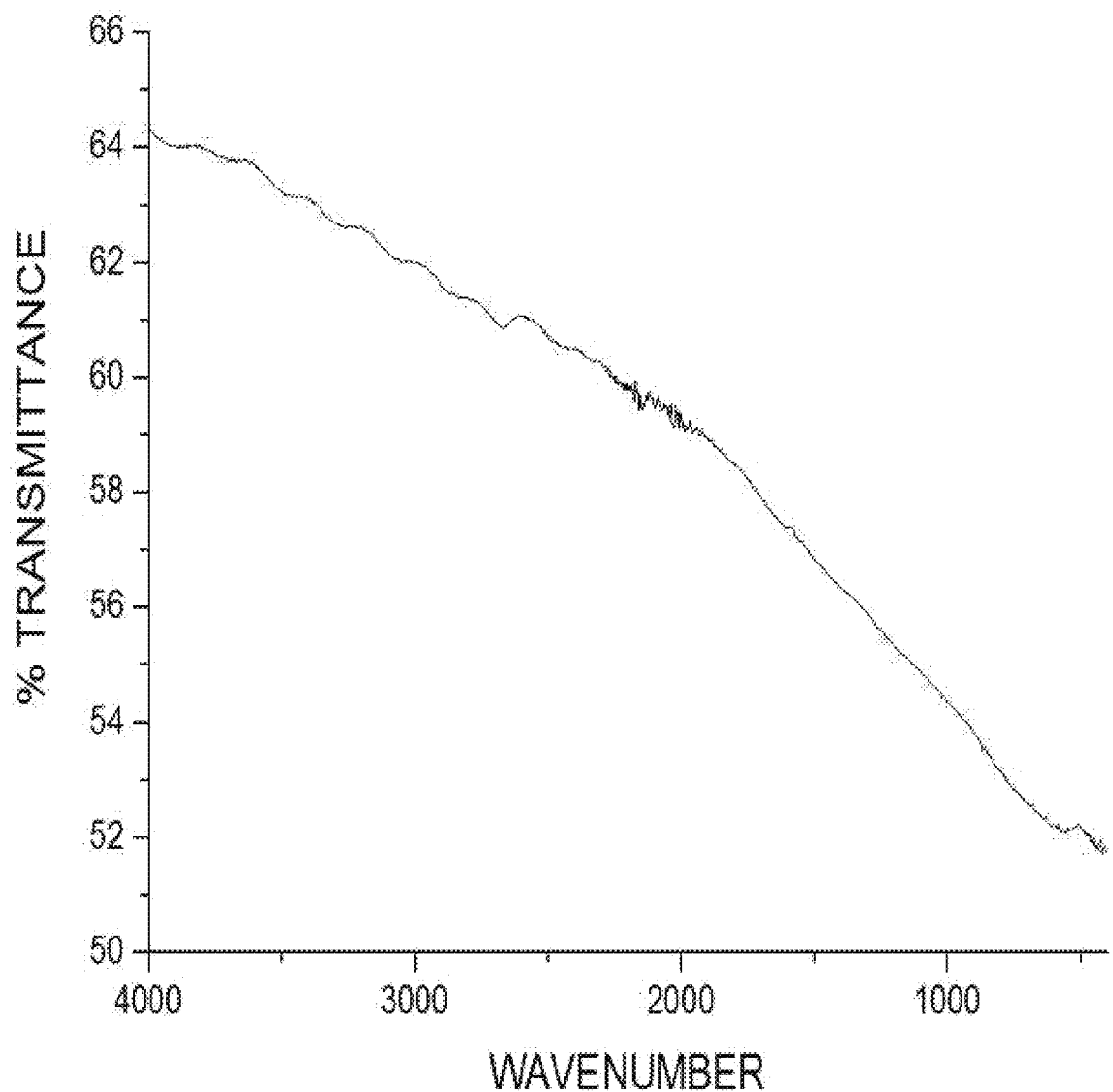

[Fig 3]
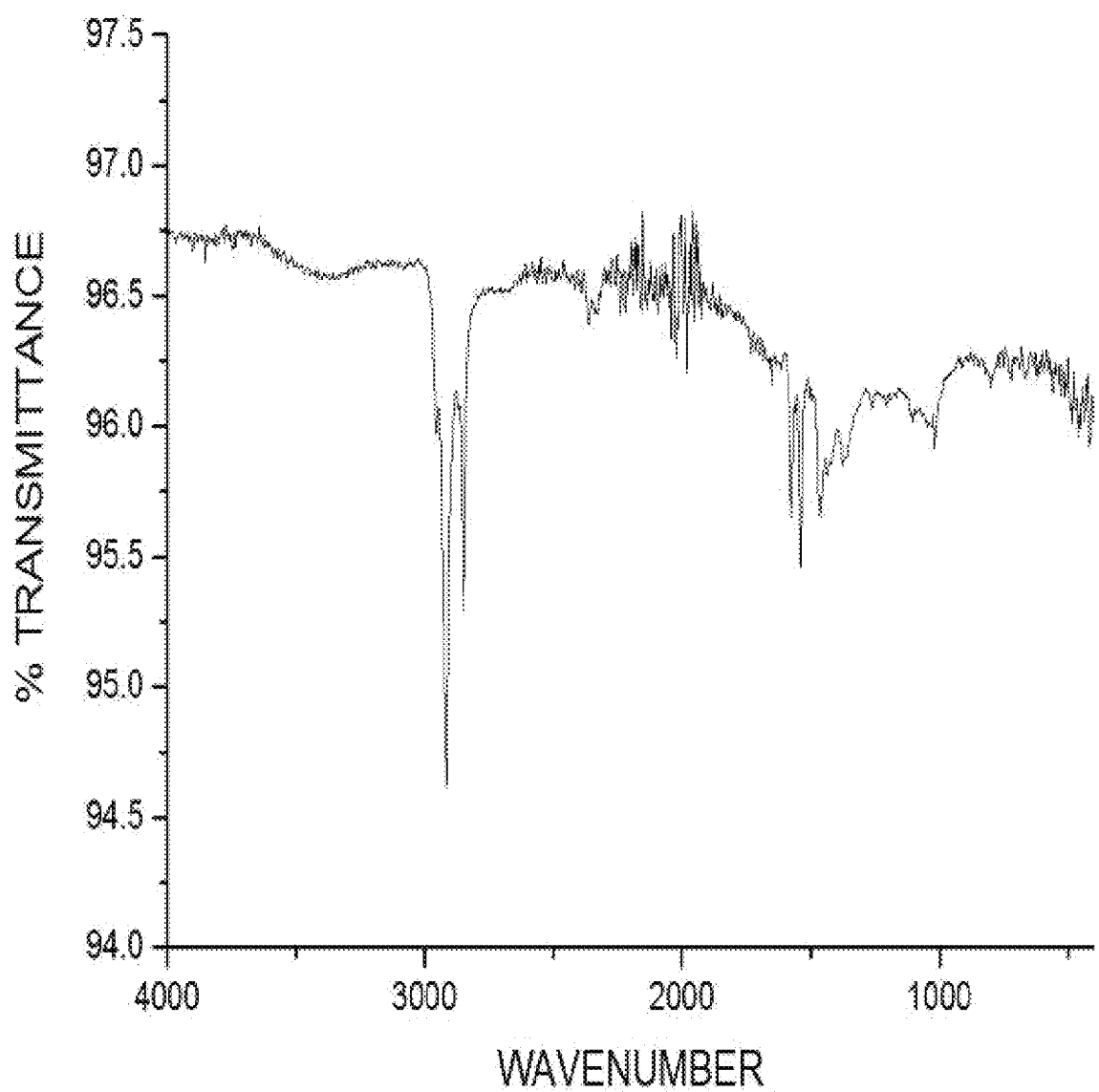

[Fig 4]
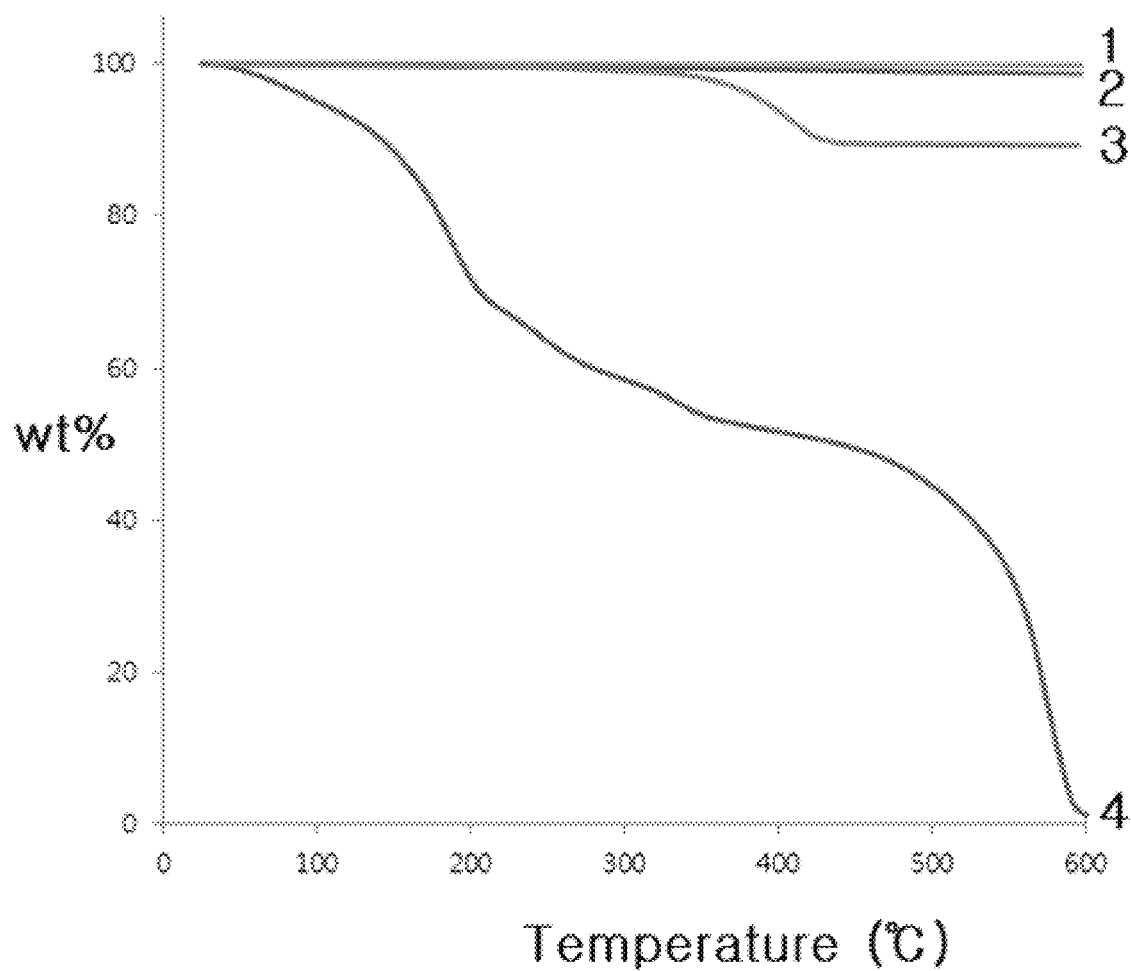

[Fig 5]
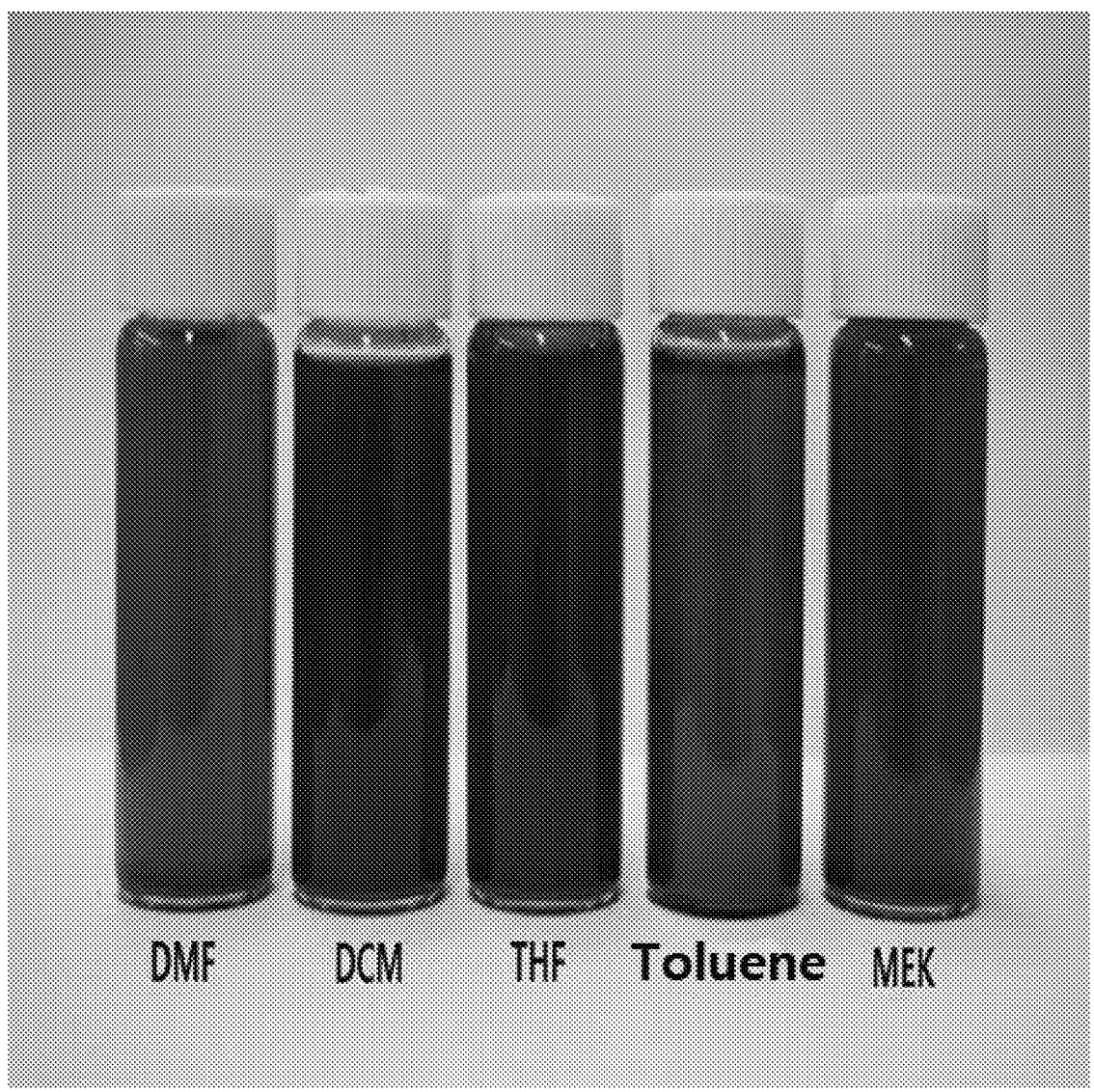

[Fig 6]
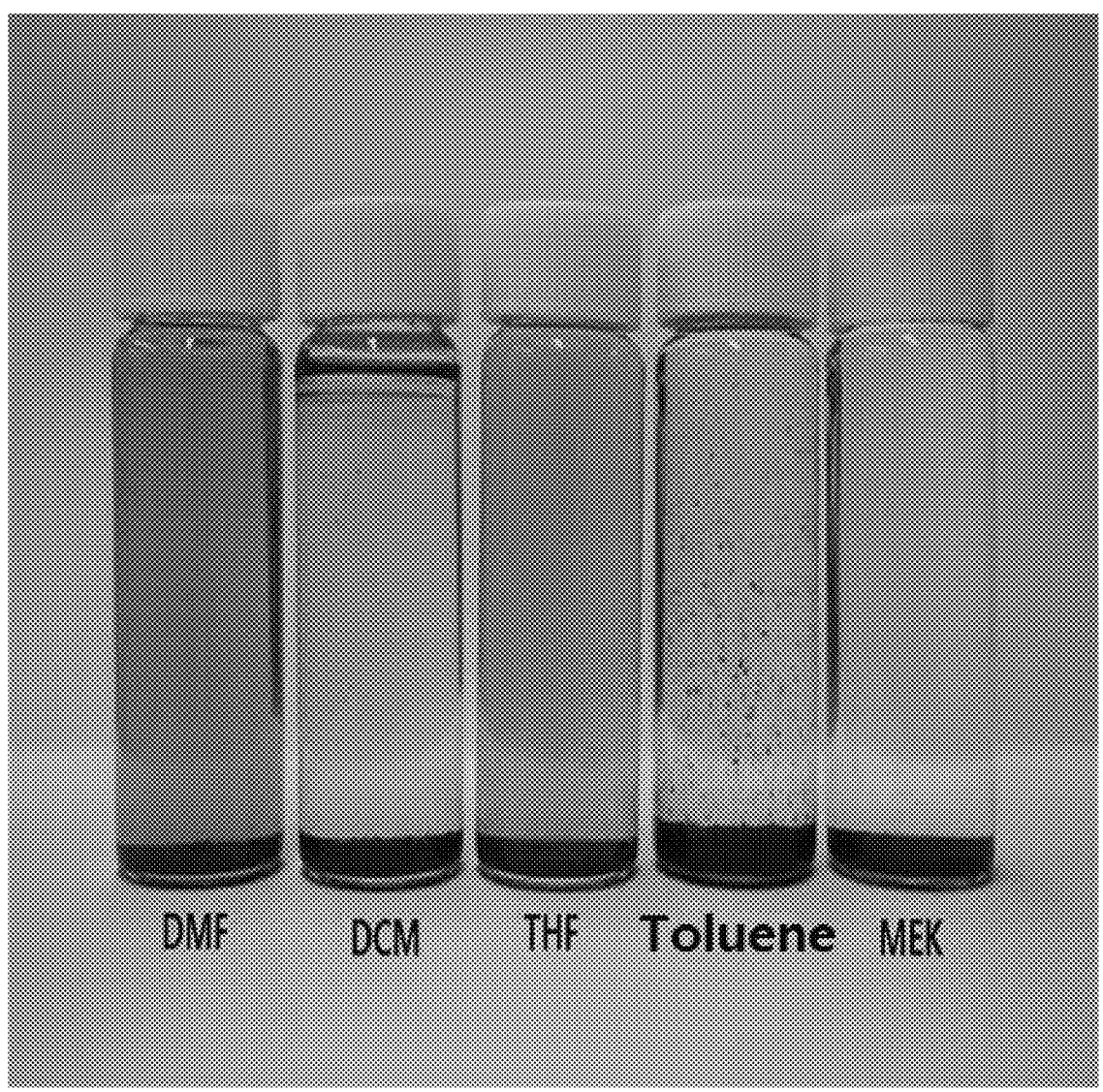

POLYMER-GRAPHENE COMPOSITE, METHOD FOR PREPARING SAME, AND POLYMER-GRAPHENE COMPOSITE COMPOSITION USING SAME

CROSS-REFERENCE TO RELATED APPLICATION(S)

The present application is a national phase entry under 35 U.S.C. § 371 of International Application No. PCT/KR2017/000220, filed Jan. 6, 2017, which claims priority from Korean Patent Application No. 10-2016-0002238, filed Jan. 7, 2016 with the Korean Intellectual Property Office, the disclosures of which are incorporated herein by reference.

TECHNICAL FIELD

The present invention relates to a polymer-graphene composite, a method for preparing the same, and a polymer-graphene composite composition using the same. More specifically, the present invention relates to a polymer-graphene composite, in which a polymer has been introduced onto the surface of graphene while maintaining the structural features and mechanical properties of the graphene, thereby realizing an excellent dispersibility in an organic solvent, a method for preparing the same, and a polymer-graphene composite composition using the same.

BACKGROUND ART

Recently, several carbon-based materials are studied and used in the field of various products or technologies such as thermoplastic resin compositions, secondary batteries, solar cells, display materials or electronic materials. For example, in order to further improve capacitance properties or electrical properties, or the like of secondary batteries or solar cells, use of carbon nanotubes or derivatives thereof, or the like has been studied and attempted. Also, for various types of semiconductor devices or display devices, or the like, attempts have been made to apply carbon-based nanomaterials such as graphene or its derivatives in order to further enhance their properties. Further, for thermoplastic resin compositions, attempts have been made to use several carbon-based materials in order to, for example, enhance their mechanical properties or add thereto novel properties such as electrical conductivity.

Among others, graphene is a semi-metallic material where carbon atoms form an arrangement connected in a hexagonal shape by two-dimensional sp2 bonding while having a thickness corresponding to a carbon atom layer. Recently, it has been reported that properties of a graphene sheet having one carbon atomic layer were evaluated, and as a result, the graphene sheet may show very excellent electrical conductivity with an electron mobility being 50,000 $cm^2/Vs$ or more.

Also, graphene has the properties of structural and chemical stability, and an excellent thermal conductivity. In addition, graphene consists of only carbon which is a relatively light element, thereby making it easy to process one-dimensional or two-dimensional nano-patterns. Due to such electrical, structural, chemical and economical properties, graphene is anticipated to replace silicon-based semiconductor technologies and transparent electrodes in the future; in particular, due to its excellent mechanical properties, graphene is expected to be applicable to a flexible electronic device field.

Recently, studies have been actively made in an attempt to further extend utilization of graphene by additionally imparting functionalities to these excellent properties of graphene. Examples thereof may include additionally introducing a functional compound or a polymer into graphene, thereby expressing functionalities simultaneously with properties unique to graphene However, since carbon materials themselves are not highly reactive, there has been a limitation in introducing a functional compound or a polymer directly onto the surface of graphene. Thus, attempts have been made to introduce a highly reactive functional group onto the surface of graphene, and then introduce a functional compound or a polymer through reaction with the functional group.

As a method for introducing a functional group onto the surface of graphene, the existing techniques have been largely using oxidation such as Hummer's method. When graphene is oxidized using an oxidizing substance such as a strong acid, functional groups such as a hydroxyl group, an epoxy group and a carboxylic acid group are formed on the surface of the oxidized graphene, and such functional groups are used to perform additional reactions.

However, when such oxidized graphene is used, it is not possible to specify types of the functional groups to be introduced and the above-mentioned hydroxyl group, epoxy group, carboxylic acid group, etc. exist in a mixed manner. Thus, when additional reactions are performed using such functional groups, types of reactions are not also specified and will only be diversified.

In addition, in the process of oxidizing graphene, oxidation reaction proceeds not only at the edges of graphene but also in the internal structure of graphene, which results in a limitation that the structural and chemical properties unique to graphene are lost. Furthermore, the use of a strong oxidant has resulted in a limitation in terms of environmental pollution.

Accordingly, there is a need for development of a surface-modifying method which allows a specific functional group to be introduced onto the surface of graphene while maintaining the structural and chemical features of the graphene.

DETAILED DESCRIPTION OF THE INVENTION

Technical Problem

An object of the present invention is to provide a polymer-graphene composite, in which a polymer has been introduced onto the surface of graphene while maintaining the structural features and mechanical properties of the graphene, thereby realizing an excellent dispersibility in an organic solvent.

Another object of the present invention is to provide a method for preparing the polymer-graphene composite.

A further object of the present invention is to provide a polymer-graphene composite composition using the polymer-graphene composite.

Technical Solution

In one embodiment of the present invention, there is provided a polymer-graphene composite including: graphene; and a polymer which is bound to the graphene through a functional group including a carbonyl group and an alkylene group having 1 to 20 carbon atoms.

In another embodiment of the present invention, there is provided a method for preparing a polymer-graphene composite, comprising the steps of: reacting graphene with a halogenated compound containing at least two halogen elements and a functional group including a carbonyl group and an alkylene group having 1 to 20 carbon atoms; and then reacting the product resulting from the above reaction step with a polymeric monomer.

In a further embodiment of the present invention, there is provided a polymer-graphene composite composition including: a binder resin or a solvent; and a polymer-graphene composite dispersed therein.

A polymer-graphene composite, a method for preparing the same, and a polymer-graphene composite composition using the same, according to specific embodiments of the invention, will be described in more detail below.

According to one embodiment of the invention, there may be provided a polymer-graphene composite including: graphene; and a polymer which is bound to the graphene through a functional group including a carbonyl group and an alkylene group having 1 to 20 carbon atoms.

The present inventors have found through experiments that, when a polymer-graphene composite is used, since a polymer has been selectively introduced onto the outer edges of graphene composed of $sp^2$ hybridized carbon, while maintaining the structural and chemical features of the graphene, both properties unique to graphene and properties of the polymer can be realized. The present invention has been completed on the basis of such finding.

In particular, it has been found that problems of not realizing properties unique to graphene, which are generated when a polymer is introduced into graphene by using a conventional oxidized graphene, such as loss of $sp^2$ hybridized carbon-related characteristics in graphene in the oxidation process thereof can be dramatically solved.

In addition, for the polymer-graphene composite of the one embodiment, as a polymer and graphene are bound to each other through a specific functional group in order to introduce the polymer into the graphene, high yields and chemical stabilities can be ensured for the finally prepared polymer-graphene composite.

Further, the structure of a monomer constituting the polymer is not limited, and thus various types of polymers can be introduced. The position to which the polymer is introduced may also vary depending on modification of the structure of the alkylene chain included in the carbonyl-based functional group.

Hereinafter, the polymer-graphene composite will be described in more detail.

Graphene

The graphene contained in the polymer-graphene composite is a carbon-based material containing mainly carbon-carbon bonds. Examples of the carbon-based material are not particularly limited and may include, for example, graphene, carbon nanotubes, graphite, carbon black, fullerene represented by C60 or other similar fullerene-based materials, or derivatives thereof.

Further, in the case of the graphene, as it has a two-dimensional planar structure composed of a single atomic layer of $sp^2$ hybridized carbon, high electrical conductivity and mechanical strength can be realized.

The graphene may have various forms such as sheet, plate or flake where one or more carbon atomic layers are stacked, and more specifically, may be mainly prepared in the form of a graphene flake having a thickness of 0.3 nm to 50 nm, or 0.3 nm to 30 nm.

The graphene flake may have a diameter of 0.1 µm to 10 µm, or 0.1 µm to 5 µm. Also, the graphene flake may have a very large area (diameter) relative to thickness, such that the ratio of a diameter to a thickness of the graphene is 50 to 6,000, or 50 to 1,000. The ratio of the diameter to the thickness of the graphene means a value (diameter/thickness) obtained by dividing the diameter of the graphene by the thickness of the graphene.

In this case, the "diameter" of the graphene flake may be defined as "the longest distance among all straight-line distances, wherein the straight-line distances, when the respective particles of the graphene flake are viewed on a plane having the largest area, are made by connecting any two points on the plane of each particle".

As such, as graphene having a small thickness and a large area, such as a graphene flake, is prepared, this graphene can more maximize and express its excellent conductivity, thermal conductivity and stability.

Due to these excellent properties of graphene, it can be used for various fields and applications, such as conductive paste compositions, conductive ink compositions, compositions for forming heat dissipation substrates, electrically conductive composites, composites for EMI shielding or conductive materials for batteries. Besides, it can be highly preferably used for any fields or applications which are known to allow or require the application of graphene.

Examples of methods for preparing the graphene are not particularly limited and may include, for example, a method which comprises the steps of: forming a dispersion which contains a carbon-based material including unoxidized graphite and a dispersant; and continuously passing the dispersion through a high-pressure homogenizer including an inlet, an outlet, and a micro channel for connecting between the inlet and the outlet, having a diameter in a micron scale, wherein the carbon-based material is exfoliated while passing through the micro channel under application of a shear force, thereby forming graphene having a thickness in nanoscale.

As such, due to the use of a dispersant prior to the exfoliation step and the use of a high-pressure homogenizer in the exfoliation step, the exfoliation method may be optimized in a state where unoxidized graphene as a raw material is more uniformly dispersed, thereby preparing graphene.

Therefore, pretreatment processes, which are essentially required for conventional exfoliation methods using a homogenizer, an ultrasonic irradiation, etc., such as a high-temperature heat treatment and crushing process for graphite for forming a graphite worm, and a separate oxidation process for forming oxidized graphite oxide, or the like may be omitted.

That is, it has been found that after a dispersion containing unoxidized graphite and a dispersant is obtained, as this dispersion is continuously passed through a high-pressure homogenizer having a predetermined structure, graphene having a smaller thickness and a large area may be prepared in a high yield even without undergoing an additional pretreatment process.

Herein, "continuously" proceeding with a subsequent exfoliating process using a high pressure homogenizer, after obtaining the dispersion, may refer to not proceeding with an additional heat treatment or crushing process, an oxidation process, or the like, between the forming process of the dispersion and the exfoliating process, and hereinafter, unless otherwise stated, may be interpreted in the same meaning.

As such, as the pretreatment process such as the high-temperature heat treatment and crushing process, the oxidation process, or the like is possible to be omitted, the generation of a number of defects in such pretreatment process may be suppressed, and the preparation process of graphene may be very simplified. Particularly, a previously used process of exfoliating oxidized graphite to obtain oxidized graphene, which is then reduced again to obtain graphene, may also be omitted, and thus, the preparation process of graphene showing excellent electrical properties, and the like may be very simplified.

Therefore, graphene having minimized generation of defects, and a smaller thickness and a large area, and thus, showing excellent properties may be prepared by a very simplified process.

That is, the graphene used in the one embodiment is completely distinguished from oxidized graphene used in the existing graphene-related technical fields, and what makes the graphene distinguishable from the existing oxidized graphene results from the use of the above-mentioned specific preparation method of graphene, for example, a method comprising the steps of: forming a dispersion containing a carbon-based material including unoxidized graphite and a dispersant; and continuously passing the dispersion through a high-pressure homogenizer including an inlet, an outlet, and a micro channel having a diameter in microscale and connecting between the inlet and the outlet.

Specifically, the graphene used in the one embodiment may contain an oxidative functional group, such as a hydroxyl group (—OH), a carbonyl group (—CO—) and a carboxyl group (—COOH), which is included in oxidized graphene, in an amount of less than 1% by weight, or less than 0.1% by weight, or less than 0.01% by weight, or 0.001% by weight to 1% by weight, or 0.001% by weight to 0.1% by weight, or 0.001% by weight to 0.01% by weight, based on the total weight of graphene. "The content of the oxidative functional group is less than 1% by weight, or less than 0.1% by weight, or less than 0.01% by weight, or 0.001% by weight to 1% by weight, or 0.001% by weight to 0.1% by weight, or 0.001% by weight to 0.01% by weight, based on the total weight of graphene" may mean that an oxidative functional group is never contained in the graphene or it is contained in a very small amount compared to oxidized graphene.

In addition, in the existing method, during the preparing process or after the preparation of graphene, for the purpose of additionally improving the dispersibility of the exfoliated graphene and forming the dispersion, dispersed composition or the like for application in various uses, it was necessary to further add a dispersant to the exfoliated graphene, and further proceed with ultrasonic dispersion and the like. Moreover, in such existing method, crushing in a sheet direction of the graphene may be generated in the ultrasonic irradiation process and the like, and thus, the area of graphene may be more decreased, and the properties thereof may also be deteriorated.

However, in the method for preparing graphene, as the exfoliating process using a high pressure homogenizer proceeds in a dispersion state containing the dispersant, the dispersion of graphene may be carried out together during the exfoliating process. Therefore, a post-treatment process such as ultrasonic irradiation for the dispersibility improvement is not necessary, and in the course of the process, crushing of graphene in a sheet direction may also be suppressed, and thus, after preparing graphene having a larger area or the dispersion thereof by a very simplified process, the graphene and the dispersion thereof may be preferably applied in various uses.

Meanwhile, hereinafter, the method for preparing graphene will be described in more detail for each step. First, the method for preparing graphene may include forming a dispersion containing a carbon-based material including unoxidized graphite and a dispersant.

Herein, the type of the unoxidized graphite, usable as the raw material is not particularly limited, and as the graphite neither oxidized nor pretreated by an additional process, graphite or the like carbon structure has a three-dimensional structure in the form where carbon atomic layers are stacked, any carbon-based material to prepare graphene and the like having one or more carbon atomic layers by exfoliating it by any physical force such as high speed, high pressure, ultrasonic irradiation or shear force, may be used.

Therefore, specific examples of such unoxidized graphite include amorphous graphite, planar graphite, artificial graphite, or the like may be included, and a mixture of two or more compounds selected therefrom may be used as the unoxidized graphite which is the raw material.

More suitably, among the unoxidized graphite, planar graphite may be used. Due to the use of such planar graphite, the formation of graphene by exfoliating may be more effectively achieved. Therefore, the pretreatment process such as a high-temperature heat treatment and crushing process for forming a graphite worm, an additional oxidation process for forming oxidized graphite, or the like may be omitted, and graphene having a smaller thickness and a larger area by being more effectively exfoliated by a high pressure homogenizer, may be prepared. Therefore, through this, graphene having more excellent properties and minimized defect generation may be well-prepared.

Further, the dispersion may be a dispersion in which a carbon-based material including unoxidized graphite and a dispersant are dissolved or dispersed in an aqueous solvent or a polar organic solvent. Since this dispersion may be present in a state where the carbon-based material including unoxidized graphite is uniformly dispersed by the action of a dispersant, a subsequent exfoliating process may proceed in such an optimized dispersed state to effectively form a graphene flake having a smaller thickness and large area.

In addition, in the dispersion used as the raw material, the aqueous solvent or the polar organic solvent may include any aqueous solvent or polar organic solvent such as one or more selected from the group consisting of water, NMP, acetone, DMF (N,N-dimethylformamide), DMSO (Dimethyl sulfoxide), ethanol, isopropyl alcohol, methanol, butanol, 2-ethoxy ethanol, 2-butoxy ethanol, 2-methoxy propanol, THF (tetrahydrofuran), ethylene glycol, pyridine, dimethylacetamide, N-vinyl pyrrolidone, methyl ethyl ketone (butanone), α-terpinol, formic acid, ethyl acetate and acrylonitrile.

In addition, as the dispersant, any material which has been known before to be usable for uniformly dispersing various carbon-based materials in a polar solvent, such as tannic acid, Triton X-100 (trade name) or Pluronics F-127 (trade name), may be used. However, more suitably, a dispersant including a mixture of plural types of polyaromatic hydrocarbon oxides, containing the polyaromatic hydrocarbon oxides having a molecular weight of about 300 to 1,000 in a content of about 60% by weight or more, may be used.

The certain dispersant was newly prepared by the present inventors, and filed as a Korean Patent Application No. 10-2013-0091625 (Aug. 1, 2013), which will be described in detail as follows.

Pitch which is discharged as a residue and the like in a refining process of fossil fuels such as petroleum or coal, is a byproduct used for asphalt production, and the like, and may be formed as a viscous mixture containing plural types of polyaromatic hydrocarbons having a plurality of aromatic rings. However, as a result of the present inventor's experiment, it was confirmed that if such pitch and the like undergo an oxidation process using an oxidant, among polyaromatic hydrocarbons contained in the pitch, polyaromatic hydrocarbons having excessively large molecular weight are at least partly decomposed, and a mixture of polyaromatic hydrocarbons having a relatively narrow molecular weight distribution is obtained. In addition, it was confirmed that as one or more oxygen-containing functional groups are introduced to the aromatic ring of each polyaromatic hydrocarbon, a mixture containing plural types of polyaromatic hydrocarbon oxides is obtained.

Specifically, a mixture of polyaromatic hydrocarbon oxides obtained in this method was confirmed to contain polyaromatic hydrocarbon oxides having a molecular weight of about 300 to 1,000, or about 300 to 700 in an amount of about 60% by weight or more, or about 65% by weight or more, or about 70% by weight to 95% by weight, as analyzed by MALDI-TOF MS. Specific types, structure, distribution and the like of the polyaromatic hydrocarbon oxides contained in the mixture may be varied depending on the type or origin of the pitch as a raw material, the type of an oxidant, or the like. However, at least, the mixture of the polyaromatic hydrocarbon oxides included in the dispersant contains plural types of polyaromatic hydrocarbon oxides having a structure where one or more oxygen-containing functional groups are introduced to each polyaromatic hydrocarbon having 5 to 30, or 7 to 20 benzene rings, respectively, and the polyaromatic hydrocarbon oxides in the mixture have the above-described molecular weight distribution, that is, a molecular weight distribution where oxides having a molecular weight of about 300 to 1,000, or about 300 to 700 are contained in about 60% by weight or more, based on the total compound.

Herein, the type of the oxygen-containing functional group may be varied depending on the type of the oxidant used in the oxidation process of the pitch and the like, but for example, may be one or more selected from the group consisting of a hydroxy group, an epoxy group, a carboxy group, a nitro group and sulphonic acid.

The polyaromatic hydrocarbon oxides satisfying the above-described structural feature, the molecular weight distribution and the like, and the mixture thereof may have both a hydrophobic π-domain gathering aromatic rings, and a hydrophilic region by the oxygen-containing functional groups bonded to the aromatic ring and the like, at the same time. Among these, the hydrophobic π-π domain may π-π interact with a surface of the carbon-based material in which carbon-carbon bonds are formed such as unoxidized graphite, or graphene (flake), and the hydrophilic region may express repulsion between each single carbon-based material (for example, each particle of each graphene or graphite). As a result, the above-described dispersant including the mixture of the polyaromatic hydrocarbon oxides may be present between the molecules of the carbon-based material in a liquid medium such as an aqueous solvent or a polar organic solvent, and uniformly disperse the carbon-based material. Therefore, it has been found that the dispersant may represent an excellent dispersion force to uniformly disperse the carbon-based material in a higher concentration even in the case of using relatively small amount.

Moreover, since the above-described dispersant represents water-solubility per se due to the presence of a hydrophilic region by the oxygen-containing functional group and the like, it may uniformly disperse the carbon-based material even in an environmentally friendly aqueous solvent. In particular, the dispersant has been found to represent an excellent dispersion force to uniformly disperse the carbon-based material in a high concentration, in various polar organic solvents, as well as an environmentally friendly aqueous solvent.

Due to the excellent dispersion force of the dispersant, unoxidized graphite as a raw material may be more uniformly dispersed in a high concentration. Therefore, by exfoliating the raw material in such optimized dispersion state, graphene having a smaller thickness and a large area, may be more easily prepared. Moreover, since the dispersant may be maintained in a state of being physically attached to the surface of a finally formed graphene, which enables the graphene prepared per se to represent excellent dispersibility in various polar solvents, and the like.

Meanwhile, the above-described dispersant may have an oxygen content in the total mixture of about 12% by weight to 50% by weight, or about 15% by weight to 45% by weight, based on the total element content, when the plural types of polyaromatic hydrocarbon oxides contained in the dispersant are subjected to elemental analysis. Such oxygen content reflects a degree of the introduction of the oxygen-containing functional group by the oxidation process in the polyaromatic hydrocarbon oxides, and as the oxygen content is satisfied, the above-described hydrophilic region may be included in an appropriate degree. As a result, in the above-described method, unoxidized graphite as a raw material may be more uniformly dispersed using the dispersant; graphene having a small thickness may be more effectively obtained therefrom; and the dispersibility of the finally prepared graphene may be more improved.

The oxygen content may be calculated by elemental analysis of the plural types of polyaromatic hydrocarbon oxides contained in the above-described mixture. That is, when a sample of the mixture (for example, about 1 mg) is, for example, heated to a high temperature of around about 900° C. on a thin foil, the foil is instantaneously melted so that the temperature is raised to about 1500 to 1800° C., and by such high temperature, gas is generated from the mixture sample, thereby collecting generated gas, and measuring and analyzing the element content thereof. As a result of the elemental analysis, total element contents of carbon, oxygen, hydrogen and nitrogen contained in the plural types of polyaromatic hydrocarbon oxides may be measured and analyzed, and the oxygen content with respect to the total element content may be calculated.

Meanwhile, the above-described dispersant may be prepared by a method including oxidizing the mixture containing polyaromatic hydrocarbon having a molecular weight of about 200 to 1500 in the presence of an oxidant.

As already described above, pitch discharged as a residue in the refining process of fossil fuels such as petroleum or coal, may contain plural types of polyaromatic hydrocarbon, and be in a mixture state of being viscous or in a powder form. Of course, the specific types, structure, compositional ratio or molecular weight distribution of the polyaromatic hydrocarbon may be varied depending on the raw material or origin of the pitch, however, the pitch may include plural types of polyaromatic hydrocarbons containing for example, 5 to 50 aromatic rings such as benzene rings in the structure, and largely include polyaromatic hydrocarbons having a molecular weight of about 200 to 1500. For example, a mixture including polyaromatic hydrocarbons having a molecular weight of about 200 to 1500 (e.g., pitch), used as a starting material in a method of preparing the dispersant, may include the polyaromatic hydrocarbons in such molecular weight range in a content of about 80% by weight or more, or about 90% by weight or more.

However, if a mixture including polyaromatic hydrocarbons such as the pitch undergo an oxidation process using an oxidant, among polyaromatic hydrocarbons contained in the pitch, polyaromatic hydrocarbons having excessively large molecular weight may be decomposed, and a mixture of polyaromatic hydrocarbons having a relatively narrow molecular weight distribution may be obtained. For example, polyaromatic hydrocarbons having a molecular weight more than about 700 or about 1,000 may be decomposed into those having a less molecular weight. In addition, as one or more oxygen-containing functional groups are also introduced into each aromatic ring of each polyaromatic hydrocarbon, a mixture including plural types of polyaromatic hydrocarbon oxides, that is, a dispersant used in the method of an exemplary embodiment may be very simply prepared.

In the method of preparing the dispersant, the type of oxidant is not particularly limited, and any oxidant may be used without limitation as long as it causes an oxidation reaction by which an oxygen-containing functional group is introduced into an aromatic hydrocarbon. Specific examples of the oxidant may include nitric acid ($HNO_3$), sulfuric acid ($H_2SO_4$), hydrogen peroxide ($H_2O_2$), ammonium cerium (IV) sulfate (($NH_4)_4Ce(SO_4)_4$), ammonium cerium(IV) nitrate (($NH_4)_2Ce(NO_3)_6$), or the like, and of course, a mixture of two or more selected therefrom may also be used.

Further, such oxidation process may proceed at a reaction temperature of about 10° C. to 110° C. for about 0.5 hours to 20 hours, in an aqueous solvent. As a specific example, the mixture containing the polyaromatic hydrocarbons may be added in a certain amount, in the presence of a liquid phase oxidant such as sulfuric acid and/or nitric acid, and the oxidation process may proceed at room temperature, for example, at about 20° C. or 80° C., for about 1 hours to 12 hours. As the reaction temperature, hour or the like in the oxidation process is controlled, the properties of the above-described dispersant, for example, an oxidation degree of the polyaromatic hydrocarbons may be properly adjusted to prepare a dispersant having desired properties.

Further, as described above, the mixture containing polyaromatic hydrocarbons having a molecular weight of about 200 to 1500, which is a starting material of the preparation method may be derived from pitch obtained from fossil fuels or a product thereof, and the type, structure or molecular weight distribution of the polyaromatic hydrocarbons may be different from each other depending on the type of these raw materials. Nevertheless, as the mixture containing the polyaromatic hydrocarbons having a molecular weight of about 200 to 1500, derived from the pitch and the like is subjected to an oxidation process, the above-described dispersant exhibiting an excellent dispersion force to carbon-based materials may be simply prepared.

Meanwhile, the above-mentioned preparation method may further include purifying the resulting product after the oxidation step to obtain a mixture of plural types of polyaromatic hydrocarbon oxides, and such purification step may proceed by including centrifuging the product resulting from the oxidation step. As such purification step is performed, the mixture of the polyaromatic hydrocarbon oxides satisfying the above-described molecular weight distribution, etc. may be obtained appropriately in a higher purity, and by using the dispersant including the mixture, graphene may be more effectively prepared.

Meanwhile, after forming and providing the dispersion, the dispersion may be continuously passed through the high pressure homogenizer having a predetermined structure, thereby exfoliating unoxidized graphite contained in the dispersion, through which graphene can be prepared.

Conventionally, a method of proceeding with the exfoliating process using a high speed homogenizer, a ball mill, a bead mill or an ultrasonic irradiator, has been known. However, in the case of a method using ultrasonic irradiation, it may be difficult to obtain graphene having a uniform thickness and a large area, or a number of defects may occur on the graphene in the exfoliating process, or an exfoliation yield may be insufficient. Likewise, in the case of a method of using a ball mill or a bead mill, it may also be difficult to obtain graphene having sufficiently small thickness, and an exfoliation yield may also be insufficient. In addition to this, in case of the existing method using a homogenizer such as a high speed homogenizer, it is necessary to proceed with a high-temperature heat treatment and crushing process for forming a graphite worm, a oxidation process for forming oxidized graphite, or the like, and also in the course of performing such process, there are disadvantages that a number of defects may occur on graphene, and mass productivity may become poor. In particular, it has never been well-known before that only an exfoliating process on unoxidized graphite with a homogenizer and the like may proceed, without a pretreatment process such as additional oxidation process, high-temperature heat treatment process, crushing process, or the like, thereby preparing graphene having a large area and a small thickness corresponding to several atomic layers.

However, the present inventors have first discovered that exfoliation may be performed continuously (that is, without an additional pretreatment process) in an unoxidized graphite state by applying the method using a high pressure homogenizer, thereby preparing graphene having a large area and a small thickness, and having minimized generation of defects. Therefore, it has been found that in case of proceeding with the exfoliating process using a high pressure homogenizer, graphene having a smaller and uniform thickness and a large area, and having minimized occurrence of defects, may be easily mass-produced, without an additional pretreatment process, and thus, the problems of the above-described existing methods may be solved.

The high pressure homogenizer may be configured to include an inlet of raw materials, an outlet of a product resulting from exfoliating such as graphene flakes, and a micro channel for connecting between the inlet and the outlet and having a diameter in a micron scale. When raw material in the form of a dispersion containing unoxidized graphite is fed through the inlet of the high-pressure homogenizer while applying, for example, a high pressure of about 100 to 3000 bar, the speed of the raw material may be accelerated to a supersonic speed while passing through the micro channel having a diameter in a micron (μm) scale, such as about 1 mm or less, or 10 μm to 800 μm, and thus a high shear force may be applied.

Due to the action of the shear force, the graphene may be more easily exfoliated between carbon atomic layers where carbon atoms are bonded to each other by the van der Waals force, than on a basal plane of unoxidized graphite forming a covalent bond. Thus, the graphene having a very small thickness and a large area may be effectively formed. In the method for preparing graphene, synergistic action with the above-described dispersant allows mass-production of graphene having a very small thickness and a large area without defects and in a more simplified process.

Meanwhile, the above-described preparation method of graphene may further include recovering and drying graphene flakes from the dispersion of the graphene flakes, wherein the recovering may be performed by centrifugation, vacuum filtration or pressure filtration. Further, the drying may be performed by vacuum drying at a temperature of about 30° C. to 200° C.

Polymer

As the polymer-graphene composite includes a polymer, it can simultaneously express the properties of both graphene and polymer. In particular, the dispersibility unique to the polymer allows the polymer-graphene composite to realize improved dispersibility compared to graphene alone. As a result, graphene has improved dispersibility in various types of organic solvents, which makes it easy for the graphene to be applied for various uses.

Examples of polymers included in the polymer-graphene composite are not particularly limited, and various polymers previously known in the art may be used without limitation. Examples of the polymers may include one or more polymers selected from the group consisting of a polyglycol-based polymer, a polyvinyl-based polymer, a polyolefin-based polymer, a polyester-based polymer, a polyamide-based polymer, a polyimide-based polymer, a polyether-based polymer, a polysilicon-based polymer, polyfluorine-based polymer, a nylon-based polymer, and a polyurethane-based polymer.

Specifically, the polyvinyl-based polymer may include a homopolymer of a vinylic monomer, or a copolymer of a vinylic monomer and another monomer. The vinylic monomer is a compound containing vinyl groups in its molecular structure and may form a cross-linked structure via the vinyl groups.

Examples of the vinylic monomer may include a functionalized methacrylate, acrylate, styrene, or a mixture of two or more thereof selected from the group consisting of methyl methacrylate, ethyl methacrylate, propyl methacrylate, butyl methacrylate, 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate, butyl acrylate, 2-ethylhexyl acrylate, isobornyl acrylate, acrylic acid, benzyl acrylate, phenyl acrylate, acrylonitrile, glycidyl methacrylate, 2-hydroxyethyl methacrylate, hydroxypropyl methacrylate, hydroxybutyl methacrylate, N,N-dimethylaminoethyl methacrylate, N,N-diethylaminoethyl methacrylate, triethylene glycol methacrylate, itaconic anhydride, itaconic acid, glycidyl acrylate, 2-hydroxyethyl acrylate, hydroxypropyl acrylate, hydroxybutyl acrylate, N,N-dimethylaminoethyl acrylate, N,N-diethylaminoethyl acrylate, triethylene glycol acrylate, methacrylamide, N-methyl acrylamide, N,N-dimethylacrylamide, N-tert-butyl methacrylamide, N-n-butyl methacrylamide, N-methylol methacrylamide, N-ethylol methacrylamide, N-tert-butyl acrylamide, N-n-butyl acrylamide, N-methylol acrylamide, N-ethylol acrylamide, vinylbenzoic acid, diethylaminostyrene, alpha-methylvinylbenzoic acid, diethylamino alpha-methylstyrene, p-vinylbenzenesulphonic acid, p-vinylbenzenesulphonic acid sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, isoprene, chloroprene and propylene.

More specifically, the polyvinyl-based polymer may include one or more polymers selected from the group consisting of polystyrene, polyacrylate, polymethacrylate, and polyacrylonitrile.

The content of the polymer included in the polymer-graphene composite may be 0.1% by weight to 30% by weight, or 1% by weight to 20% by weight. Examples of methods of measuring the content of the polymer included in the polymer-graphene composite are not particularly limited, and, for example, thermogravimetric analysis (TGA) may be used. The thermogravimetric analysis (TGA) is a method of measuring the change in weight of a sample while heating it from room temperature to a temperature of 600° C. under a nitrogen atmosphere using a thermogravimetric analyzer, wherein the content of the polymer can be measured through a weight loss fraction.

Polymer-Graphene Composite

In the polymer-graphene composite of the one embodiment, the graphene and the polymer may be bound to each other through a functional group including a carbonyl group and an alkylene group having 1 to 20 carbon atoms. That is, in the polymer-graphene composite, the functional group may be positioned between the graphene and the polymer to form a bond with the graphene and a bond with the polymer.

The functional group is a multivalent functional group having at least two functional points, and the functional points mean points at which the functional group can form bonds with other atoms, atomic groups, polymers, and the like. The functional group may be classified, depending on the number of functional points, into a divalent functional group when it has two functional points, a trivalent functional group when it has three functional points, and the like.

The functional group may include a carbonyl group and an alkylene group having 1 to 20 carbon atoms. The carbonyl group means a functional group having a double bond between a carbon atom and an oxygen atom.

The alkylene group is a multivalent functional group derived from an alkane and, for example, may be straight-chain, branched or cyclic and include a methylene group, an ethylene group, a propylene group, an isobutylene group, a sec-butylene group, a tert-butylene group, a pentylene group, a hexylene group, or the like. At least one hydrogen atom contained in the alkylene group may be substituted with a substituent.

Examples of the substituent may include an alkyl group having 1 to 10 carbon atoms, an alkenyl group having 2 to 10 carbon atoms, an alkynyl group having 2 to 10 carbon atoms, an aryl group having 6 to 12 carbon atoms, a heteroaryl group having 2 to 12 carbon atoms, an arylalkyl group having 6 to 12 carbon atoms, a halogen atom, a cyano group, an amino group, an amidino group, a nitro group, an amide group, a carbonyl group, a hydroxyl group, a sulfonyl group, a carbamate group, an alkoxy group having 1 to 10 carbon atoms, and the like.

The substitution means that an alkyl group having 1 to 10 carbon atoms or an aryl group having 6 to 20 carbon atoms is bound in place of a hydrogen atom contained in the straight-chain or branched-chain alkylene group having 1 to 20 carbon atoms, and the number of functional groups to be substituted is not limited, but at least one functional group may be substituted.

The alkylene group having 1 to 20 carbon atoms may specifically include a straight-chain alkylene group having 1 to 20 carbon atoms or a branched-chain alkylene group having 3 to 20 carbon atoms.

On the other hand, in the functional group, the carbonyl group and the alkylene group having 1 to 20 carbon atoms may be directly bound to each other. That is, one of both terminals of the carbonyl group and one of both terminals of the alkylene group having 1 to 20 carbon atoms may form a bond with each other.

Also, the carbonyl group and the graphene may be directly bound to each other. That is, among both terminals of the carbonyl group, another terminal, which is other than one terminal bound to the alkylene group having 1 to 20 carbon atoms, may form a bond with the graphene. As will be described below, since a Friedel-Craft reaction is used as a method of introducing the functional group into the graphene, the graphene and the carbonyl carbon may be directly bound to each other. The carbonyl carbon means a carbon atom forming a double bond with oxygen in the carbonyl-based functional group.

In addition, the site of the graphene bound to the carbonyl group may be edge carbons contained in the graphene. In the graphene having a two-dimensional planar structure, the edge carbons of the graphene mean carbons existing at the outermost locations of the two-dimensional plane. As such, as the polymer binds to the carbons at the edges of the graphene, the internal two-dimensional planar structure of the graphene and the sp2 hybridized carbon characteristics can be maintained.

Further, the alkylene group having 1 to 20 carbon atoms and the polymer may be directly bound to each other. That is, among both terminals of the alkylene group having 1 to 20 carbon atoms, another terminal, which is other than one terminal bound to the carbonyl group, may form a bond with the polymer.

More specifically, the functional group may be a functional group represented by the following Chemical Formula 1. The following Formula 1 is a divalent functional group since it has a total of two functional points, X and Y.

[Chemical Formula 1]

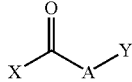

in the above Chemical Formula 1, A represents an alkylene group having 1 to 20 carbon atoms, X represents a point bound with the graphene, and Y represents a point bound with the polymer.

On the other hand, the polymer-graphene composite may further include a halogen element bound to the terminal of the polymer. The terminal of the polymer refers to a terminal of the main chain in the context of the main chain in the polymer. The halogen element is an element belonging to Group 17 of the periodic table, and, for example, chlorine (Cl), bromine (Br) or iodine (I) may be used.

Examples of methods for preparing the polymer-graphene composite of the above-described one embodiment are not particularly limited, and may include the method for preparing a polymer-graphene composite as will be described below. That is, the polymer-graphene composite of the one embodiment may be prepared by the method for preparing a polymer-graphene composite as will be described below.

On the other hand, according to another embodiment of the invention, there may be provided a method for preparing the polymer-graphene composite comprising the steps of: reacting graphene with a halogenated compound containing at least two halogen elements and a functional group including a carbonyl group and an alkylene group having 1 to 20 carbon atoms; and then reacting the product resulting from the above reaction step with a polymeric monomer.

The present inventors have found through experiments that, when the above-described specific method for preparing the polymer-graphene composite is used, a halogenated compound can be introduced into graphene while maintaining the structural and chemical properties of the graphene, and also a polymer can be introduced into the graphene at a specific position through polymeric polymerization from the halogenated compound, thereby completing the present invention.

In particular, in the method for preparing a polymer-graphene composite of the above embodiment, a halogenated compound is introduced into the graphene, and then polymeric polymerization may be performed through reaction with a polymeric monomer, wherein the process of introducing the halogenated compound may be performed under gentle conditions, thereby ensuring a stably high yield simultaneously with environmental-friendliness.

Hereinafter, the method for preparing a polymer-graphene composite will be described in more detail.

Step of Reacting Graphene with a Halogenated Compound

The method for preparing a polymer-graphene composite may include reacting graphene with a halogenated compound containing at least two halogen elements and a functional group including a carbonyl group and an alkylene group having 1 to 20 carbon atoms.

The description relating to the graphene includes that mentioned above for the one embodiment.

The halogenated compound may specifically contain at least two halogen elements and a functional group including a carbonyl group and an alkylene group having 1 to 20 carbon atoms. The description relating to the functional group including a carbonyl group and an alkylene group having 1 to 20 carbon atoms includes that mentioned above for the one embodiment.

The halogen element is an element belonging to Group 17 of the periodic table, and, for example, chlorine (Cl), bromine (Br), iodine (I), or a mixture of two or more thereof may be used. The at least two halogen elements contained in the halogenated compound may be the same or different.

In particular, in the method for preparing a polymer-graphene composite, one halogen element contained in the halogenated compound is removed in the step of reacting the halogenated compound with the graphene, and one other halogen element is further removed in the step of reacting the halogenated compound with a monomer. Thus, the halogenated compound must have at least two halogen elements, and it is not possible to prepare the polymer-graphene composite when the number of halogen elements contained in the halogenated compound is less than two.

The at least two halogen elements may be bound to the functional points of the functional group. As described above in the one embodiment, the functional points mean points at which the functional group can form bonds with other atoms, atomic groups, polymers, and the like.

The functional group has two functional points, wherein the halogen element bound to one functional point reacts with graphene in the presence of a metal salt catalyst to form a bond with the graphene, and the halogen element bound to the other functional point may react with a monomer in the presence of a metal complex catalyst.

Specific examples of the halogenated compound are not particularly limited and may include a compound represented by the following Chemical Formula 2.

[Chemical Formula 2]

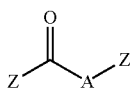

In the above Chemical Formula 2, A is an alkylene group having 1 to 20 carbon atoms, and Z is a halogen element. The description relating to the alkylene group includes that mentioned above for the one embodiment.

More specific examples of the halogenated compound may include α-bromoisobutyryl bromide (BIBB).

More specifically, the step of reacting graphene with the halogenated compound containing at least two halogen elements and a functional group including a carbonyl group and an alkylene group having 1 to 20 carbon atoms may be performed in the presence of a metal salt catalyst.

The metal salt is used as a catalyst for the reaction, and specific examples thereof are not particularly limited and, for example, a Lewis acid catalyst such as $AlCl_3$, $FeCl_3$ or $ZnCl_2$ may be used. In the presence of the metal salt catalyst, one halogen element contained in the halogenated compound may be removed to form an acylium ion, and the acylium ion may bind graphene through an electrophilic substitution reaction.

That is, in the step of reacting the graphene with the halogenated compound in the presence of the metal salt catalyst, a Friedel-Craft acylation reaction may be performed, and the Friedel-Craft acylation reaction may be performed at a temperature of 0° C. to 300° C., or 50° C. to 150° C. for 1 hours to 50 hours.

More specifically, examples of the Friedel-Craft acylation reaction may include mixing an $AlCl_3$ catalyst with α-bromoisobutyryl bromide (BIBB) 1 to form an acylium ion 2, followed by reaction with graphene 3 at a temperature of 90° C. for 20 hours to form an acylated graphene 4 through covalent bonding between graphene 3 and the acylium ion 2, as illustrated in the following Reaction Scheme 1.

[Reaction Scheme 1]

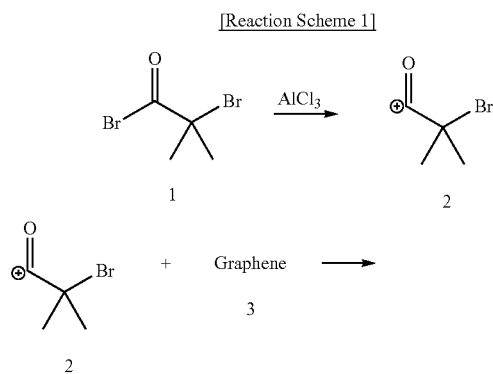

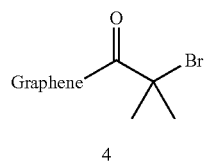

In the step of reacting the graphene with the halogenated compound in the presence of the metal salt catalyst, a solvent may be used if necessary. Examples of the solvent are not particularly limited and various solvents used in organic reactions may be used without limitation. Preferably, 1,2-dichlorobenzene may be used.

In the step of reacting the graphene with the halogenated compound, 10 parts by weight to 1,000 parts by weight, or 120 parts by weight to 500 parts by weight of the halogenated compound may be mixed and reacted with respect to 100 parts by weight of the graphene. When the halogenated compound is added in an excessively small content with respect to that of the graphene, the halogenated compound is not sufficiently introduced into the graphene, and this may cause the density of the growing polymers to become low, thereby reducing the dispersibility of the polymer-graphene composite.

On the other hand, when the halogenated compound is added in an excessively large content with respect to that of the graphene, economic efficiency may be reduced due to the use of an excessive amount of the halogenated compound.

Step of Reacting a Halogenated Compound with a Monomer

The method for preparing a polymer-graphene composite may include reacting a halogenated compound with a polymeric monomer. This step allows effective control of polymeric polymerization on the surface of graphene, thereby greatly improving dispersibility characteristics thereof.

The polymeric monomer is a basic unit compound used for polymeric polymerization, and may include a compound used to form the polymer described above, for example, a polyglycol-based polymer, a polyvinyl-based polymer, a polyolefin-based polymer, a polyester-based polymer, a polyamide-based polymer, a polyimide-based polymer, a polyether-based polymer, a polysilicon-based polymer, a polyfluorine-based polymer, a nylon-based polymer, and a polyurethane-based polymer.

In particular, the polymeric monomer used for preparing the polyvinyl-based polymer is a vinylic monomer. The vinylic monomer is a compound containing vinyl groups in its molecular structure and may include, for example, a functionalized methacrylate, acrylate, styrene, or a mixture of two or more thereof selected from the group consisting of methyl methacrylate, ethyl methacrylate, propyl methacrylate, butyl methacrylate, 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate, butyl acrylate, 2-ethylhexyl acrylate, isobornyl acrylate, acrylic acid, benzyl acrylate, phenyl acrylate, acrylonitrile, glycidyl methacrylate, 2-hydroxyethyl methacrylate, hydroxypropyl methacrylate, hydroxybutyl methacrylate, N,N-dimethylaminoethyl methacrylate, N,N-diethylaminoethyl methacrylate, triethylene glycol methacrylate, itaconic anhydride, itaconic acid, glycidyl acrylate, 2-hydroxyethyl acrylate, hydroxypropyl acrylate, hydroxybutyl acrylate, N,N-dimethylaminoethyl acrylate, N,N-diethylaminoethyl acrylate, triethylene glycol acrylate, methacrylamide, N-methyl acrylamide, N,N-dimethylacrylamide, N-tert-butyl methacrylamide, N-n-butyl methacrylamide, N-methylol methacrylamide, N-ethylol methacrylamide, N-tert-butyl acrylamide, N-n-butyl acrylamide, N-methylol acrylamide, N-ethylol acrylamide, vinylbenzoic acid, diethylaminostyrene, alpha-methylvinylbenzoic acid, diethylamino alpha-methylstyrene, p-vinylbenzenesulphonic acid, p-vinylbenzenesulphonic acid sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, isoprene, chloroprene and propylene.

The step of reacting the halogenated compound with the polymeric monomer may be performed in the presence of a metal complex catalyst. Examples of the metal complex catalyst are not particularly limited, and may include, for example, a metal salt, a ligand compound, or a mixture thereof.

Examples of the metal salt may include a copper metal salt such as copper bromide (CuBr), and examples of the ligand compound may include an amine compound such as N,N,N',N,N-pentamethyldiethylenetriamine (PMDETA).

More specifically, in the mixture of a metal salt and a ligand compound, 100 parts by weight to 1,000 parts by weight, or 120 parts by weight to 500 parts by weight of the ligand compound may be used and mixed with respect to 100 parts by weight of the metal salt compound.

Specifically, in the step of reacting the halogenated compound with the polymeric monomer, an atom transfer radical polymerization (ATRP) reaction may be performed, and the ATRP reaction may be performed at a temperature of 0° C. to 300° C., or 50° C. to 200° C. for 10 hours to 100 hours.

More specifically, by way of an example of the ATRP reaction, as illustrated in the following Reaction Scheme 2, the acylated graphene 4 prepared in the above Scheme 1 may be mixed with styrene monomer 5 in the presence of CuBr and N,N,N',N,N-pentamethyldiethylenetriamine (PMDETA), followed by polymerization at 100° C. for 40 hours.

[Reaction Scheme 2]

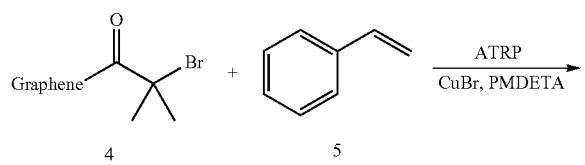

-continued

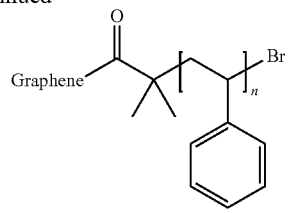

Subsequent to the step of reacting the halogenated compound with the monomer, a step of replacing the terminal halogen element with hydrogen may be further included. Examples of methods of replacing the terminal halogen element with hydrogen may include a method of adding a silane compound and a radical initiator.

Examples of the silane compound are not particularly limited, and may include, for example, triethylsilane, phenylsilane, diphenylsilane, tripropylsilane, triphenylsilane, tribenzylsilane, tributylsilane, di-tert-butylsilane, diethoxysilane, dimethoxysilane, phenyldiethoxyethylsilane, dimethylsilane, halosilane, tris(trimethylsilyl)silane, or a mixture of two or more thereof.

Examples of the radical initiator are not particularly limited, and the following may be used: azo compounds such as 2,2'-azobis(2-methyl)propanenitrile (or AIBN), 1,1'-azobis(1-cyclohexanenitrile) and 4,4'-azobis(4-cyanovaleric acid); diacyl peroxides such as dibenzoyl peroxide and didodecanoyl peroxide; dialkyl peroxides such as di-t-butyl peroxide and diisopropyl peroxide; dicumyl peroxides; peroxy-dicarbonates; peresters such as t-butyl peracetate, t-amyl perpivalate, butyl per-2-ethyl hexanoate, t-butyl perpivalate and t-butyl perbenzoate; hydroperoxides such as t-butyl hydroperoxide; inorganic peroxides such as an aqueous hydrogen peroxide solution; and peroxy compounds such as sodium persulfate or potassium persulfate; and the like.

Specific examples of the step of replacing the terminal halogen element with hydrogen may include adding 3 g of tris(trimethylsilyl)silane and 200 mg of azobisisobutyronitrile (AIBN), and performing reaction at 70° C. for 20 hours.

On the other hand, according to another embodiment of the invention, there may be provided a polymer-graphene composite composition including: a binder resin or a solvent; and the polymer-graphene composite of the one embodiment dispersed therein. Such a dispersion composition may be used in various ways such as application thereof to a substrate, printing and patterning the same, or casting the same directly into a film.

Examples of the specific types of the binder resin or the solvent contained in the polymer-graphene composite dispersion composition are not particularly limited, and a wide variety of conventionally known polymer resins, organic solvents, inorganic solvents, and water-based solvents may be used without limitation.

More specifically, as an example of the solvent, one or more selected from the group consisting of the following may be used: water, NMP, acetone, N,N-dimethylformamide (DMF), dimethyl sulfoxide (DMSO), ethanol, isopropyl alcohol, methanol, butanol, 2-ethoxy ethanol, 2-butoxy ethanol, 2-methoxy propanol, tetrahydrofuran (THF), ethylene glycol, pyridine, dimethylacetamide, N-vinylpyrrolidone, methyl ethyl ketone (butanone), alpha-terpineol, formic acid, ethyl acetate and acrylonitrile.

The polymer-graphene composite dispersion composition may also include the polymer-graphene composite of the one embodiment, dispersed in the binder resin or the solvent. As the polymer-graphene composite includes a polymer bound to graphene, since the polymer-graphene composite has an excellent dispersibility in an organic solvent to an aqueous solution, or a binder resin, on the basis of high compatibility, it has an advantage of easy formation of a dispersion composition.

Examples of the specific state of the polymer-graphene composite dispersion composition are not limited, and may be in a solid, liquid or resin state, depending on the conditions. When the polymer-graphene composite dispersion composition is in a liquid state, the concentration of the polymer-graphene composite in the dispersion may be 0.01 mg/ml to 10 mg/ml, or 0.1 mg/ml to 1 mg/ml.

Examples of methods of dispersing the polymer-graphene composite of the one embodiment in the binder resin or the solvent are not particularly limited, and, for example, sonication, a homogenizer, a high-pressure homogenizer may be used to do so.

BRIEF DESCRIPTION OF THE DRAWINGS

FIG. 1 illustrates the measurement results of IR spectrum for the graphene obtained in the Preparative Examples.

FIG. 2 illustrates the measurement results of IR spectrum for the functionalized graphene obtained in the Examples.

FIG. 3 illustrates the measurement results of IR spectrum for the polymer-graphene composite obtained in the Examples.

FIG. 4 illustrates the measurement results by thermogravimetric analysis for the graphene 1 obtained in the Preparative Examples, the functionalized graphene 2 obtained in the Examples, the polymer-graphene composite 3 obtained in the Examples, and the polymer-graphene composite 4 obtained in Comparative Example 2.

FIG. 5 illustrates the measurement results of dispersibility for the polymer-graphene composite dispersion obtained in the Examples.

FIG. 6 illustrates the measurement results of dispersibility for the graphene dispersion obtained in the Comparative Example 1.

DETAILED DESCRIPTION OF THE EMBODIMENTS

The present invention will be described in more detail with reference to the Examples below. However, these Examples are provided for illustrative purposes only, and should not be construed as limiting the scope of the present invention to these Examples.

Preparative Examples: Preparation of Graphene (1) Preparation of Dispersant

The following oxidation and purification processes were performed on pitch, which is a petroleum byproduct obtained from POSCO, to prepare a dispersant.

First, 0.5 to 1.5 g of the pitch was added to 75 ml of a mixed solution of sulfuric acid/nitric acid (volume ratio of 3:1), and oxidation reaction was performed at 70° C. for about 3.5 hours.

Subsequently, the pitch reaction solution, which had undergone the oxidation reaction, was cooled to room temperature, then diluted approximately 5-fold with distilled water, and then centrifuged at about 3500 rpm for 30 minutes. Then, the supernatant was removed, an equal amount of distilled water was added for re-dispersion, followed by centrifugation again under the same conditions to finally recover and dry the precipitate. In this way, a dispersant was prepared.

(2) Preparation of Graphene Flake 2.5 g of planar graphite was added to 500 ml of an aqueous dispersion, in which 0.1 g of the dispersant was dispersed, to form a dispersion. This dispersion was introduced into the inlet of a high-pressure homogenizer at a high pressure of about 1,600 bar to pass through the micro channel. This process was repeated ten times. In this way, the planar graphite was exfoliated, and thus a graphene flake was prepared.

Examples: Preparation of Functionalized Graphene, Graphene-Polymer Composite and Graphene-Polymer Composite Dispersion 1. Preparation of Functionalized Graphene

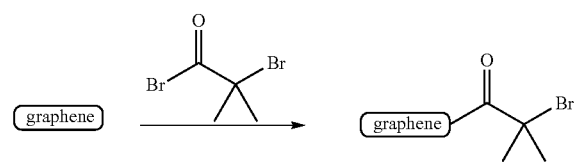

In an ice bath, 6.65 g of an AlCl$_3$ catalyst was added to 100 ml of 1,2-dichlorobenzene, and 7 g of the graphene flake prepared in the Preparative Examples and 11.5 g of α-bromoisobutyryl bromide (BIBB) were added and mixed, and then the mixture was subjected to a Friedel-Craft acylation reaction at a temperature of 90° C. for 20 hours to prepare a functionalized graphene.

2. Preparation of Polymer-Graphene Composite

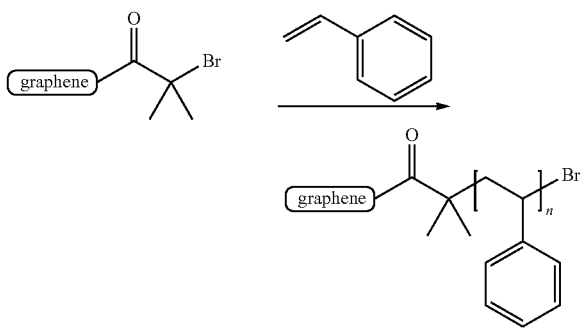

50 mg of copper bromide (CuBr) and 87 mg of N,N,N', N,N-pentamethyldiethylenetriamine (PMDETA) were added to 100 ml of styrene, and the mixture was stirred at room temperature for 20 minutes while injecting nitrogen. Then, 3 g of the functionalized graphene was added, followed by an atom transfer radical polymerization (ATRP) reaction at a temperature of 100° C. for 40 hours to prepare a polymer-graphene composite.

3. Preparation of Polymer-Graphene Composite Dispersion

The polymer-graphene composite obtained in the Examples was added at a concentration of 0.5 mg/ml to the respective solvents of dimethylformamide (DMF), dichloromethane (DCM), tetrahydrofuran (THF), toluene, and methyl ethyl ketone (MEK), and sonicated for 30 minutes to prepare polymer-graphene composite dispersions.

Comparative Examples: Preparation of Graphene Dispersion

Comparative Example 1

The graphene flake obtained in the Preparative Examples was added at a concentration of 0.5 mg/ml to the respective solvents of dimethylformamide (DMF), dichloromethane (DCM), tetrahydrofuran (THF), toluene, and methyl ethyl ketone (MEK), and sonicated for 30 minutes to prepare graphene dispersions.

Comparative Example 2

A polymer-graphene oxide composite was prepared in the same manner as in the Examples, except that graphene oxide (GO) powder prepared by a conventional oxidation process (for example, Hummer's method or a modified Hummer's method) of graphite was used instead of the graphene flake prepared in the Preparative Example.

Experimental Examples: Measurement of Properties for Preparative Examples, Examples and Comparative Examples The properties for the graphene obtained in the Preparative Examples, and the functionalized graphene, graphene-polymer composite and graphene-polymer composite dispersion obtained in the Examples were measured by the following methods. In the same manner, the properties for the graphene-polymer composite or graphene dispersion obtained in the Comparative Examples were measured and compared.

Experimental Example 1. IR Spectrum

IR spectrum was measured for each of the graphene obtained in the Preparative Examples, and the functionalized graphene and graphene-polymer composite obtained in the Examples, and the results were illustrated in FIGS. 1 to 3, respectively, as set forth in Table 1 below.

TABLE 1

| | Results of Experimental Example 1 | | |
|---|---|---|---|
| Category | Graphene | Functionalized graphene | Polymer-graphene composite |
| IR Spectrum | FIG. 1 | FIG. 2 | FIG. 3 |

As illustrated in FIGS. 1 and 2, it can be seen that there was no significant difference in terms of IR spectrum between the graphene and the functionalized graphene. However, in the case of the polymer-graphene composite illustrated in FIG. 3, it can be seen that a significant difference was observed in terms of IR spectrum as a polymer was introduced. In particular, in view of the fact that the IR peak corresponding to the main characteristics of a polystyrene polymer was measured, it can be seen that a polymer was actually introduced into the polymer-graphene composite.

Experimental Example 2. Thermogravimetric Analysis (TGA)

For the graphene 1 obtained in the Preparative Examples, the functionalized graphene 2 and graphene-polymer composite 3 obtained in the Examples, and the graphene-polymer composite 4 obtained in Comparative Example 2, a thermogravimetric analyzer was used to measure the change in weight while heating from room temperature to a temperature of 600° C. under a nitrogen atmosphere, and the results were illustrated below in Table 2 and FIG. 4.

TABLE 2

| | Results of Experimental Example 2 | | | |
|---|---|---|---|---|
| Category | Graphene | Functionalized graphene | Polymer-graphene composite of the Examples | Polymer-graphene oxide composite of Comparative Example 2 |
| Weight loss | 0.2 wt % | 1.4 wt % | 10.2 wt % | 48 wt % (at 220° C. or less: 30 wt %/ at 220° C. to 430° C.: 18 wt %) |

As illustrated in the above Table 2 and FIG. 4, it can be seen that the pure graphene of the Preparative Examples had almost no change in weight, which is approximately 0.2 wt % even when heated at a high temperature. In addition, it can be seen that the weight loss was increased to 1.4 wt % when a BIBB-derived functional group as a functionalizing group was introduced into the graphene, and to 10.2 wt % when a polymer was introduced into the graphene.

In particular, in the case of the polymer-graphene composite of the Examples, it can be seen that since the polymer introduced into the graphene is burned as the temperature is increased, the amount of weight loss is increased. In this way, it can be seen that about 10 wt % of the polymer was introduced with respect to the entire polymer-graphene composite.

On the other hand, in the case of the polymer-graphene oxide composite of Comparative Example 2, it can be seen that that the pyrolysis curve was completely different from those of the Preparative Examples and the Examples. Specifically, referring to the thermogravimetric analysis results of the polymer-graphene oxide composite of Comparative Example 2 as illustrated below in FIG. 4, at the temperature range of 220° C. or lower, a remarkable weight loss of about 30 wt % occurred as hydroxyl group (—OH) of the graphene oxide was decomposed due to dehydration, and at the temperature range of 220° C. to 430° C., a weight loss of about 18 wt % occurred as the polymer introduced into the graphene oxide was decomposed.

That is, it can be seen that the polymer-graphene oxide composite of Comparative Example 2 contains a total of about 48 wt % of a non-conductive composition including a hydroxyl group and a polymer, and the polymer-graphene prepared in the Examples contains about 10 wt % of a non-conductive composition. As a result, it can be seen that Comparative Example 2 had a low electric conductivity compared to the Examples.

Experimental Example 3. Dispersibility

Each of the graphene-polymer composite dispersion obtained in the Examples and the graphene dispersion obtained in Comparative Example 1 was allowed to stand under the conditions of room temperature and atmospheric pressure for 48 hours, and the dispersibility was evaluated. The results were illustrated in FIGS. 5 and 6 as set forth in Table 3 below.

TABLE 3

| Results of Experimental Example 3 | | |
|---|---|---|
| Category | Examples | Comparative Example 1 |
| Dispersibility | FIG. 5 | FIG. 6 |

As illustrated in FIG. 5, it can be seen that the polymer-graphene composite dispersion prepared in the Examples was uniformly dispersed in all solvents, indicating an excellent dispersibility.

On the other hand, in the case of the dispersion prepared in Comparative Example 1, it can be seen that when the functionalized graphene was dispersed in a solvent, the functionalized graphene was not uniformly dispersed in the solvent and precipitated at the bottom, as illustrated in FIG. 6.

From these results, it can be seen through experiments that in the case of using the composite, in which a polymer is bound to graphene, as in the Examples, it is possible to exhibit an excellent dispersibility in an organic solvent.

Experimental Example 4. Electrical Conductivity

Each of the graphene-polymer composite obtained in the Examples and the graphene-polymer composite obtained in Comparative Example 2 was dispersed in a THF solvent, then filtered through a nylon filter, and dried to prepare a specimen of graphene-polymer composite sheet. The electrical conductivities of the specimens were measured under the conditions of room temperature and atmospheric pressure using a 4-probe method, and the results were illustrated in Table 4 below.

TABLE 4

| Results of Experimental Example 4 | | |
|---|---|---|
| Category | Examples | Comparative Example 2 |
| Electrical conductivity (S/cm) | 120 | 0.42 |

As illustrated in the above Table 4, it can be seen that in the case of the Examples using the pure graphene flake in a unoxidized state of the Preparative Examples, the electrical conductivity of the polymer-graphene composite was measured as high as 120 S/cm, whereas in the case of Comparative Example 2 using graphene oxide powder, the electrical conductivity of the polymer-graphene composite was significantly reduced to 0.42 S/cm. Accordingly, it can be seen that in the case of the composite of the Examples using the unoxidized graphene of the Preparative Examples, the composite has an electric conductivity as high as about 300 times that of the composite of Comparative Example 2 which is made of an oxidized graphene.

The invention claimed is:

1. A polymer-graphene composite comprising:
   graphene having a planar structure; and
   a polymer which is bound to the graphene through a functional group including a carbonyl group and an alkylene group having 1 to 20 carbon atoms,
   wherein in the polymer-graphene composite, the carbonyl group and the graphene are directly bound to each other, and
   wherein the graphene contains one or more oxidative functional groups selected from the group consisting of a hydroxyl group, a carbonyl group and a carboxyl group in an amount of less than 1% by weight based on a total weight of graphene,
   wherein in the functional group, the carbonyl group and the alkylene group having 1 to 20 carbon atoms are directly bound to each other,
   wherein a ratio of a diameter to a thickness of the graphene is 50 to 6,000.

2. The polymer-graphene composite according to claim 1, wherein in the polymer-graphene composite, the alkylene group having 1 to 20 carbon atoms and the polymer are directly bound to each other.

3. The polymer-graphene composite according to claim 1, wherein the functional group is a functional group represented by the following Chemical Formula 1:

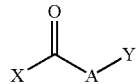

[Chemical Formula 1]

wherein in Chemical Formula 1, A represents an alkylene group having 1 to 20 carbon atoms, X represents a point bound with the graphene, and Y represents a point bound with the polymer.

4. The polymer-graphene composite according to claim 1, where in a content of the polymer included in the polymer-graphene composite is 0.1% by weight to 30% by weight.

5. The polymer-graphene composite according to claim 1, wherein the polymer includes one or more polymers selected from the group consisting of a polyglycol-based polymer, a polyvinyl-based polymer, a polyolefin-based polymer, a polyester-based polymer, a polyamide-based polymer, a polyimide-based polymer, a polyether-based polymer, a polysilicon-based polymer, polyfluorine-based polymer, a nylon-based polymer, and a polyurethane-based polymer.

6. The polymer-graphene composite according to claim 5, wherein the polyvinyl-based polymer includes one or more polymers selected from the group consisting of polystyrene, polyacrylate, polymethacrylate, and polyacrylonitrile.

* * * * *